United States Patent [19]

Agulnek

[11] 4,200,788
[45] * Apr. 29, 1980

[54] MODULAR ARRAY

[75] Inventor: Martin A. Agulnek, Sharon, Mass.

[73] Assignee: Xerox Corporation, Stamford, Conn.

[*] Notice: The portion of the term of this patent subsequent to Mar. 27, 1996, has been disclaimed.

[21] Appl. No.: 896,860

[22] Filed: Apr. 17, 1978

Related U.S. Application Data

[63] Continuation-in-part of Ser. No. 793,118, May 2, 1977, Pat. No. 4,146,786.

[51] Int. Cl.² .............................................. H01J 3/14
[52] U.S. Cl. .................................... 250/235; 250/578
[58] Field of Search ................. 358/212, 213; 250/208, 250/209, 216, 234, 235, 236, 578; 357/24

[56] References Cited

U.S. PATENT DOCUMENTS

| | | | |
|---|---|---|---|
| 1,790,736 | 2/1931 | Wald | 358/212 |
| 3,980,817 | 9/1976 | Penn | 358/212 |
| 4,071,853 | 1/1978 | Yamanaka | 358/213 |
| 4,146,786 | 3/1979 | Agulnek | 250/235 |

Primary Examiner—David C. Nelms

[57] ABSTRACT

A line scanning apparatus employing a multiplicity of linear arrays, the linear extent of which is less than the length of the scan line. To permit an entire line to be covered, the arrays are offset from one another in the direction of scan with adjoining array ends overlapped. To correct for the misalignment and redundancy introduced, the image data from the arrays is buffered until a line is completed when readout is initiated. During readout, cross over from one array to the next is effected within the overlapped areas and the redundant data discarded.

4 Claims, 11 Drawing Figures

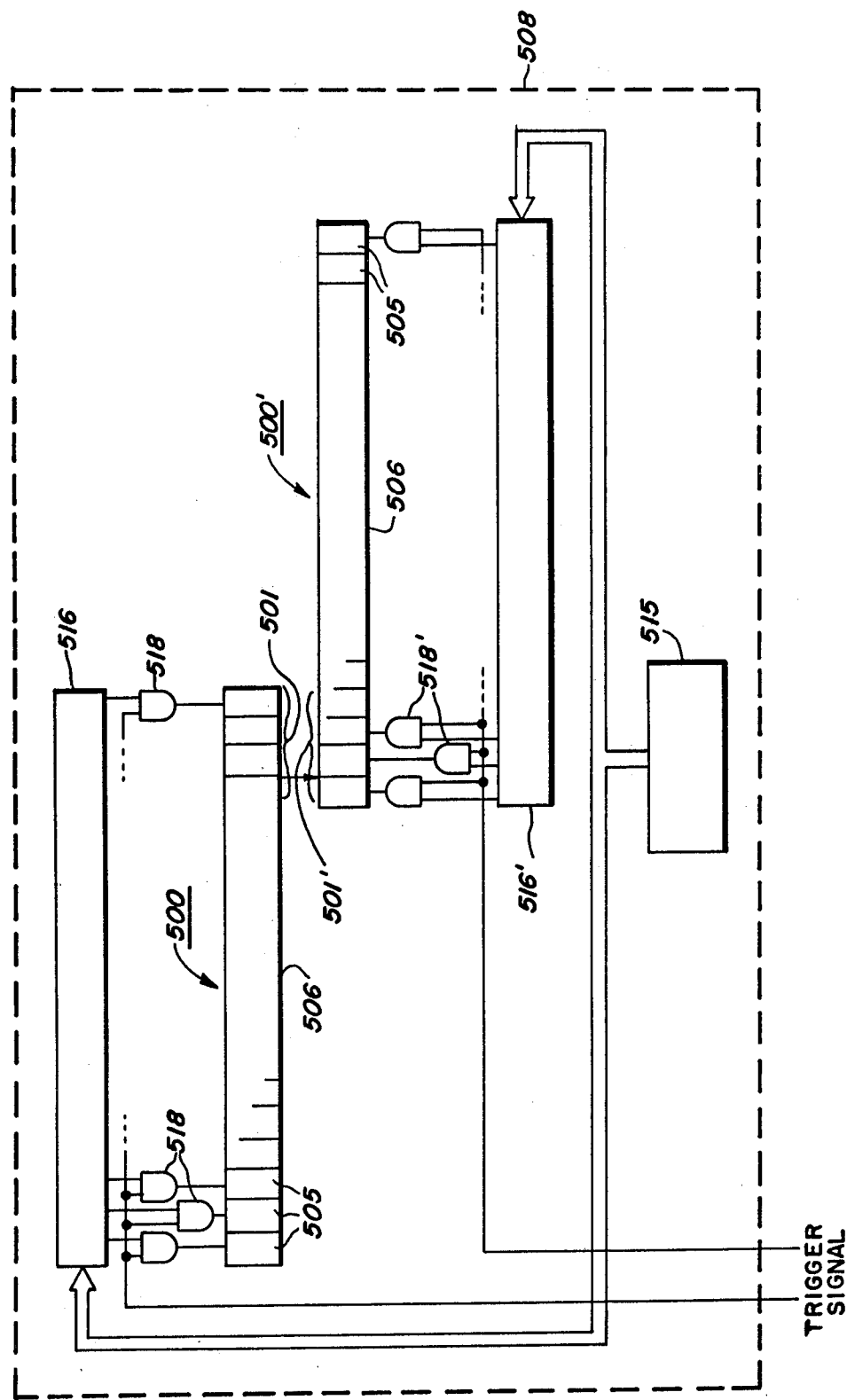

MODULAR ARRAY

This is a continuation-in-part of application Ser. No. 793,118, filed May 2, 1977, now U.S. Pat. No. 4,146,786.

This invention relates to raster input and output scanners and, more particularly to, raster input and output scanners having multiple linear arrays.

Scanning technology has progressed rapidly in recent years and today arrays of fairly substantial linear extent are available for use in raster scanners. Indeed, the linear extent of new arrays is in some cases many times the linear extent of earlier ray designs. However, the length of even these recent array designs may still not be sufficient to enable a single array to span the entire width of the normal sized line, i.e. 8½ inches.

As a result, raster scanners often rely on shorter arrays and must, therefore, employ a multiplicity of arrays if the entire line is to be scanned in one pass. This raises the question of how to place the arrays so as to cover the entire line yet provide data representative of the line which is free of aberrations at the array junctures. Recently, interest has been expressed in optically-butted arrays. However, optical and optical/mechanical arrangements often experience difficulty in meeting and maintaining the tight tolerances necessary for aberration free scanning, particularly in operating machine environments.

It is, therefore, a principal object of the present invention to provide a new and improved raster scanner employing multiple arrays.

It is an object of the present invention to provide an improved single pass line scanner employing multiple linear arrays.

It is an object of the present invention to provide a system designed to accommodate misalignment of plural linear arrays.

It is an object of the present invention to provide scanning apparatus with plural relatively short linear arrays, having a composite length at least equal to the scan width.

It is an object of the present invention to provide a line scanner incorporating plural overlapping arrays whose composite length equals the length of the scanned lines, with electronic means for switching from one array to the next without introducing noticeable aberrations and stigmatism.

It is an object of the present invention to provide an improved linear array adapted to facilitate alignment between overlapping arrays.

This invention relates to an imaging array for use in a multiple imaging array structure comprising, in combination, an array support; means forming a first relatively long linear imaging array on the support; means forming a second relatively short linear imaging array on said support, the second linear array being offset from and substantially parallel with the first imaging array, the second imaging array having a portion thereof overlapping one end of the first imaging array with the remainder of the second imaging array projecting beyond the first imaging array one end to permit the first imaging array to be disposed in end-to-end relation with a third imaging array with the projecting portion of the second array overlapping the adjoining end of the third array.

Other objects and advantages will be apparent from the following description and drawings in which:

FIG. 11 is a schematic view of an imaging or output array configuration employing paired overlapping arrays.

Figure 1:
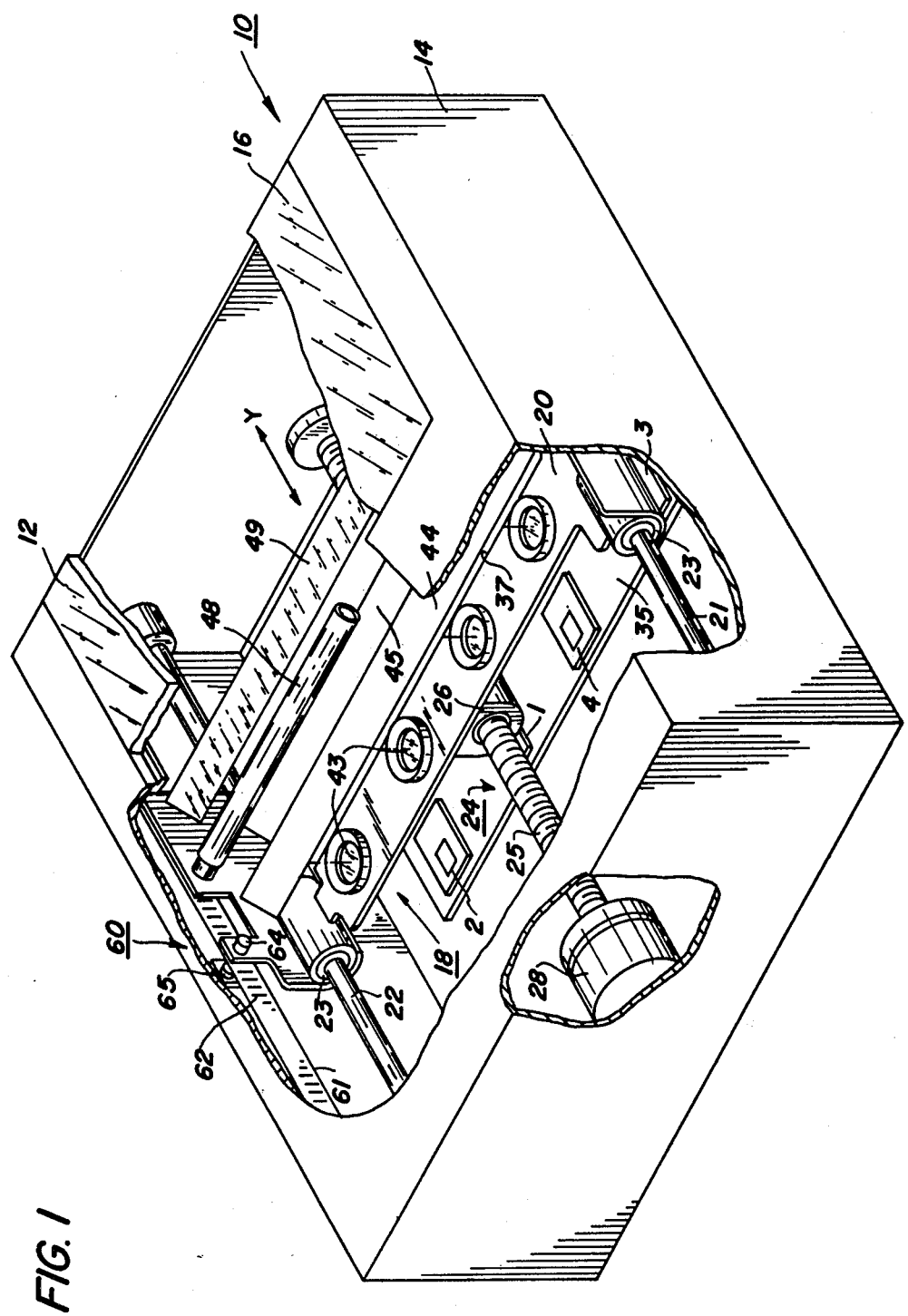
FIG. 1 is an isometric view showing a raster input scanner incorporating the multiple array arrangement of the present invention.

Referring to FIG. 1, an exemplary raster input scanning apparatus 10 is thereshown. Scanning apparatus 10, as will appear more fully herein scans an original document 12 line by line to produce a video signal representative of the original document 12. The video signal so produced may be thereafter used to reproduce or duplicate the original 12, or stored in memory for later use, or transmitted to a remote source, etc.

Scanning apparatus 10 comprises a box-like frame or housing 14, the upper surface of which includes a transparent platen section 16 on which the original document 12 to be scanned is disposed face down. A displaceable scanning mechanism designated generally by the numeral 18, is supported on frame 14 below platen 16 for movement back and forth underneath the platen 16 and the original document 12 thereon in the Y direction as shown by the solid line arrow in FIG. 1.

Scanning mechanism 18 includes a carriage 20 slideably supported upon parallel rods 21, 22 through journals 23. Rods 21, 22, which parallel the scanning direction along each side of platen 16, are suitably supported upon the frame 14.

Reciprocatory movement is imparted to carriage 20 by means of a screw type drive 24. Drive 24 includes a longitudinally extending threaded driving rod 25 rotatably journalled on frame 14 below carriage 20. Driving rod 25 is drivingly interconnected with carriage 20 through a cooperating internally threaded carriage segment 26. Driving rod 25 is driven by means of a reversible motor 28.

Figure 2:
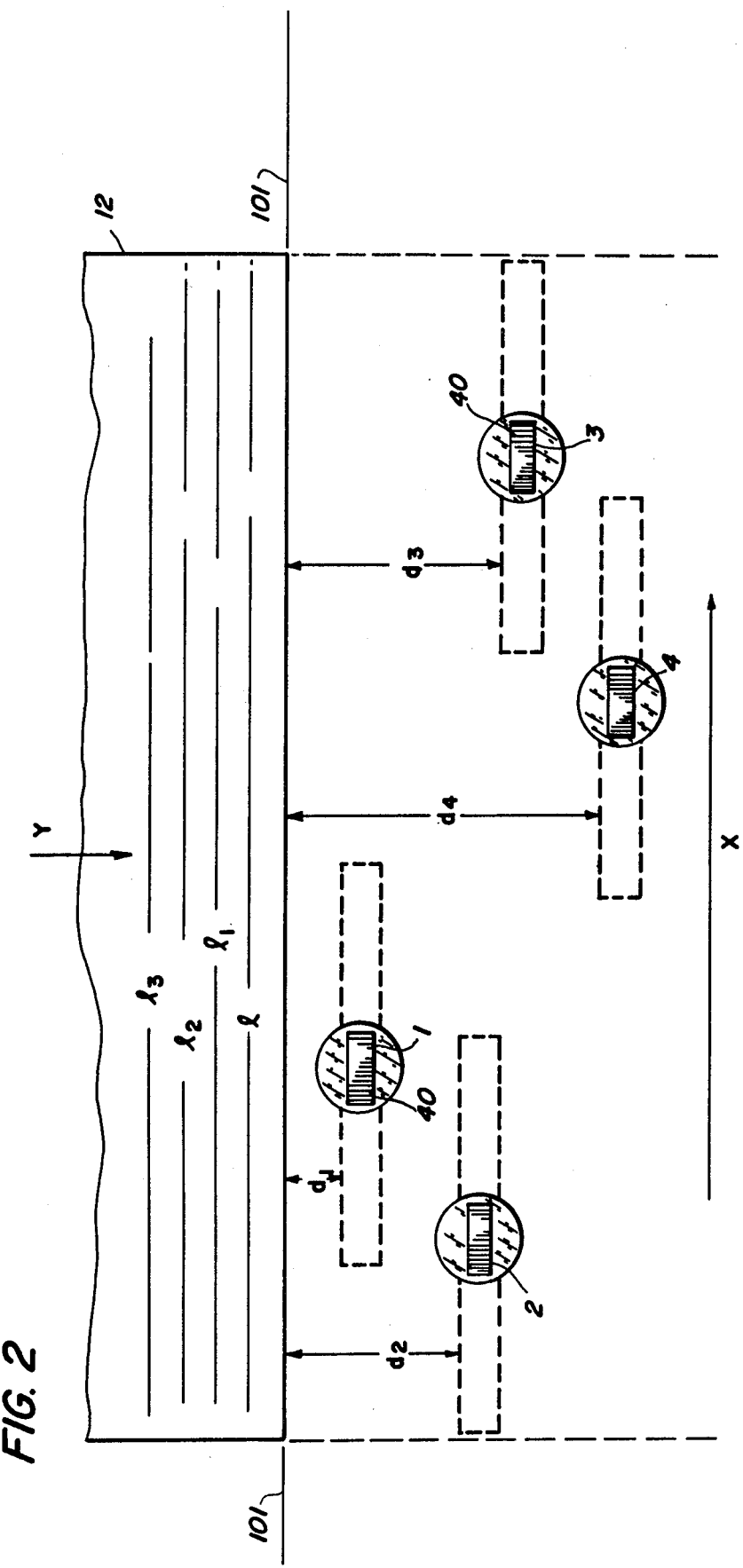
FIG. 2 is a schematic illustrating an exemplary array disposition.

A plurality of photosensitive linear arrays 1, 2, 3, 4 are carried on plate-like portion 35 of carriage 20. Arrays 1, 2, 3, 4 each comprise a series of individual photosensitive picture elements or pixels 40 arranged in succession along the array longitudinal axis. The arrays scan the original document 12 on platen 14 as scanning mechanism 18 moves therepast, scanning movement being in a direction (Y) substantially perpendicular to the array longitudinal axis (X). As best seen in FIG. 2, the arrays 1, 2, 3, 4 may, due to the difficulty in accurately aligning the arrays one with the other, be offset from one another in the direction of scanning movement (the Y direction). To accommodate the relatively short length of the individual arrays, the arrays overlap. In the exemplary illustration, the end portion of arrays 2, 1, 4 overlap the leading portion of the succeeding arrays 1, 4, 3 when looking from left to right in FIG. 2 along the X direction.

As will be understood, the length of the individual arrays 1, 2, 3, 4 may vary with different types of arrays and from manufacturer to manufacturer. As a result, the number of arrays required to cover the entire width of the original document 12 may vary from that illustrated herein.

Photosensitive elements or pixels 40 of arrays 1, 2, 3, 4 are normally silicon with carrier detection by means of photo-transistors, photodiode-MOS amplifiers, or CCD detection circuits. One suitable array is the fairchild CCD 121-1728 pixel 2-phase linear array manufactured by Fairchild Corporation. As described, arrays 1, 2, 3, 4 are offset from one another in the scanning or sagittal direction (Y direction) but with an end portion of each array overlapping the leading portion of the next succeeding array to form in effect a composite unbroken array.

To focus the image onto the arrays 1, 2, 3, 4 a lens 43 is provided for each array. Lenses 43 are supported on carriage 20 in operative disposition with the array 1, 2, 3, 4 associated therewith. Mirrors 44, 45 on carriage 20 transmit the light images of the original via lenses 43 to arrays 1, 2, 3, 4. Lamp 48 is provided for illuminating te original document 12, lamp 48 being suitably supported on carriage 20. Reflector 49 focuses the light emitted by lamp 48 onto the surface of platen 16 and the original document 12 resting thereon.

In operation, an original document 12 to be scanned is disposed on platen 16. The scanning mechanism 18 including motor 28 is actuated, motor 28 when energized operating driving mechanism 24 to move carriage 20 back and forth below platen 16. Lamp 48 is energized during the scanning cycle to illuminate the original document 12.

To correlate movement of carriage 20 with operation of arrays 1, 2, 3, 4 an encoder 60 is provided. Encoder 60 generates timing pulses proportional to the velocity of scanning mechanism 18 in the Y direction. Encoder 60 includes a timing bar 61 having a succession of spaced apertures 62 therethrough disposed along one side of the path of movement of carriage 20 in parallel with the direction of movement of carriage 20. A suitable signal generator in the form of a photocell-lamp combination 64, 65 is provided on carriage 20 of scanning mechanism 18 with timing bar 61 disposed therebetween.

As carriage 20 of scanning mechanism 18 traverses back and forth to scan platen 16 and any document 12 thereon, photocell-lamp pair 64, 65 of encoder 60 moves therewith. Movement of the photocell-lamp pair 64, 65 past timing bar 61 generates a pulse-like output signal in output lead 66 of photocell 64 directly proportional to the velocity of scanning mechanism 18.

As can be envisioned by those skilled in the art, supporting arrays 1, 2, 3, 4 in exact linear or tangential alignment (along the X-axis) and maintaining such alignment throughout the operating life of the scanning apparatus is extremely difficult and somewhat impracticable. To obviate this difficulty, arrays 1, 2, 3, 4 are initially mounted on carriage 20 in substantial tangential alignment. As can be seen in the exemplary showing of FIG. 2, this nevertheless often results in tangential array misalignment along the x-axis. If the disposition of the arrays 1, 2, 3, 4 is compared to a predetermined reference, such as the start of scan line 101 in FIG. 2, it can be seen that each array 1, 2, 3, 4 is displaced or offset from line 101 by some offset distance $d_1$, $d_2$, $d_3$, $d_4$, respectively. As will appear more fully herein, the individual offset distances of each array 1, 2, 3, 4 is determined and the result programmed in an offset counter 120 (FIG. 3) associated with each array. Offset counters 120 serve, at the start of the scanning cycle, to dely activation of the array associated therewith until the interval $d_1$, $d_2$, $d_3$, $d_4$, therefor is taken up.

Figure 3:
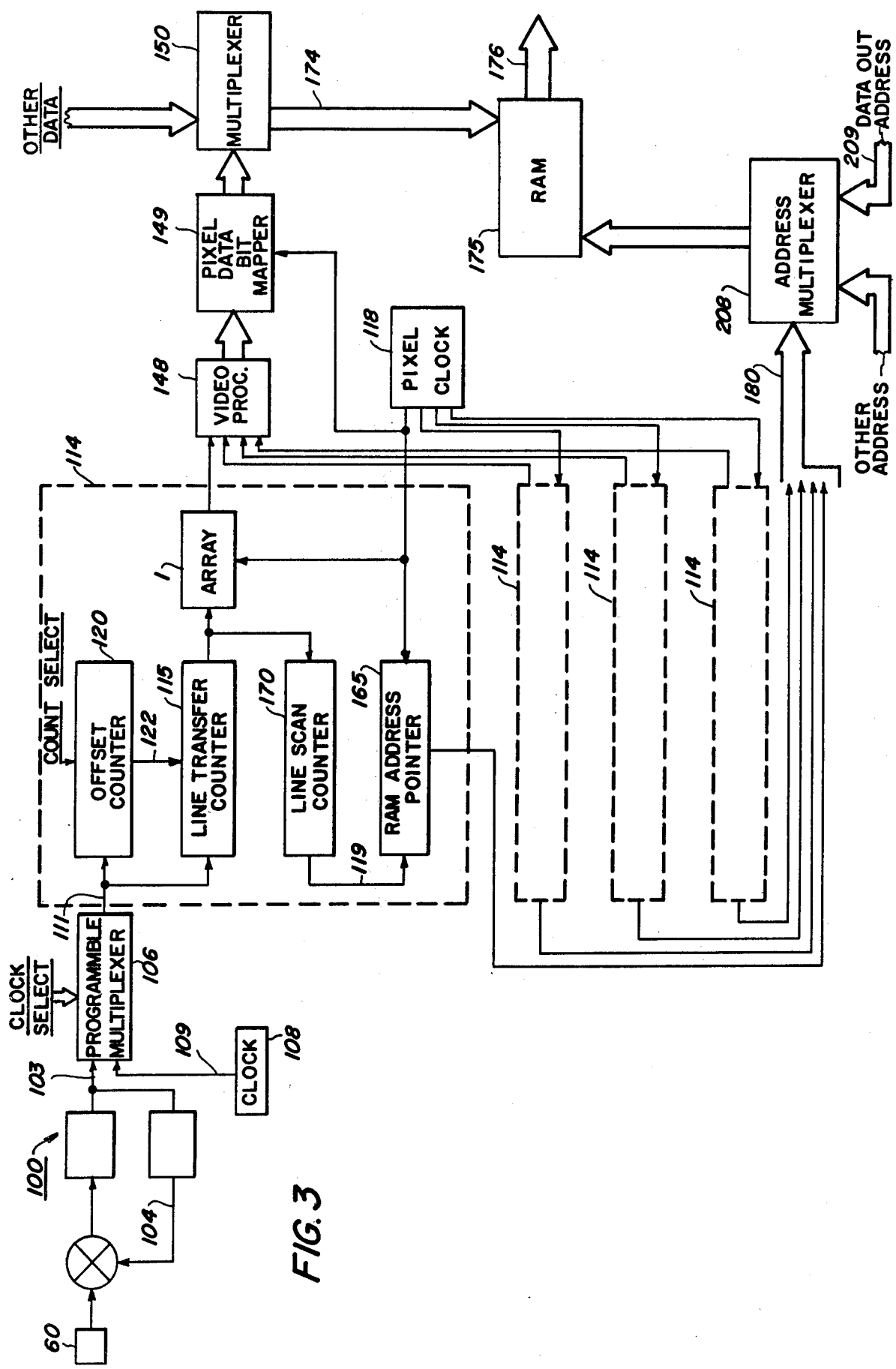
FIG. 3 is a schematic view of the scanner operating control.

Referring to FIG. 3, the pulse-like signal output of encoder 60 which is generated in response to movement of carriage 20 in the scanning direction (Y-direction), is inputted to a phase locked frequency multiplier network 100. Network 100, which is conventional, serves to multiply the relatively low frequency pulse-like signal input of encoder 60 to a high frequency clock signal in output lead 103. Feedback loop 104 of network 100 serves to phase lock the frequency of the signal in lead 103 with the frequency of the signal input from encoder 60.

As will be understood, changes in the rate of scan of carriage 20 produce a corresponding change in the frequency of the pulse-like signal generated by encoder 60. The frequency of the clock signal produced by network 100 undergoes a corresponding change. This results in a high frequency clock signal in output lead 103 directly related to the scanning velocity of carriage 20, and which accommodates variations in that velocity.

The clock signal in output lead 103 is inputted to programmable multiplexer 106. The output of a second or alternate clock signal source such as crystal controlled clock 108 is inputted via lead 109 to multiplexer 106. Multiplexer 106 selects either network 100 or clock 108 as the clock signal source is response to control instructions (CLOCK SELECT) from a suitable programmer (not shown). The selected clock signal appears in output lead 111 of multiplexer 106.

An operating circuit 114 is provided for each array 1, 2, 3, 4. Since the circuits 114 are the same for each array, the circuit 114 for array 1 only is described in detail. It is understood that the number of circuits 114 is equal to the number of arrays used.

Operating circuit 114 includes a line transfer counter 115 for controlling the array imaging line shutter or sample time for each scan. Counter 115 is driven by the clock signal in output lead 111 of multiplexer 106. It is understood that where the signal input to counter 115 comprises the clock signal produced by network 100, array sample size remains constant irrespective of variations in the velocity of carriage 20. In other words, where carriage 20 slows down, array shutter time becomes longer. If carriage 20 speeds up, array shutter time becomes shorter.

Initial actuation of line transfer counter 115 is controlled by the offset counter 120 associated therewith. Offset counter 120, which is driven by the clock signal in output lead 111, is preset to toll a count representing the time interval required for array 1 to reach start of scan line 101 following start up of carriage 20. On tolling the preset count, offset counter 120 generates a signal in lead 122 enabling line transfer counter 115.

It will be understood that the offset counters 115 associated with the circuits 114 for the remaining arrays 2, 3, 4 are similarly preset to a count representing the distance $d_2$, $d_3$, $d_4$, respectively by which arrays 2, 3, 4 are offset from start of scan line 101.

Referring particularly to FIG. 2 each array 1, 2, 3, 4 scans a portion of each line of the original document 12, the sum total of the data (less overlap as will appear more fully herein) produced by arrays 1, 2, 3, 4 representing the entire line. Preferably, arrays 1, 2, 3, 4 are of the same size with the same number of pixels 40. As described, the line transfer counters 115 of circuits 114 control the array imaging line shutter time for each scan, counters 115 being preset to activate the array associated therewith for a preselected period for this purpose. Scanned data from the arrays 1, 2, 3, 4 is clocked out by clock signals derived from a suitable pixel clock 118.

Sampled analog video data from the arrays 1, 2, 3, 4 is fed to a suitable video processor 148 which converts the video signals to a binary code representative of pixel image intensity. The binary pixel data from processor 148 is mapped into segments or words by Pixel Data Bit Mapper 149 for storage in offset relation in RAM 175 as will appear. Bit Mapper 149 is driven by clock signals from pixel clock 118. Data from Bit Mapper 149 is passed via data bus 174 to RAM 175 where the data is temporarily stored pending receipt of data from the array which last views the line. In the exemplary arrangement illustrated, the last array would be array 4.

Multiplexer 150 may be provided in data bus 174 to permit data from other sources (OTHER DATA) to be inputted to RAM 175.

The binary data is stored in sequential addresses in RAM 175 (see FIG. 4), the data being addressed into RAM 175 on a line by line basis by the RAM address pointers 165 through Address Bus 180. The clock signal output from pixel clock 118 is used to drive address pointers 165. Line scan counter 170, which is driven by the output from line transfer counter 115, controls the number of full scan lines that will be stored in RAM 175 before recycling. The output of counter 170 is fed to RAM Address pointer 165 via lead 119. It is understood that line scan counters 170 are individually preset to reflect the degree of array offset in the Y-direction.

Ram 175 provides a buffer for scanned data from each array, RAM 175 buffering the data until a full line is completed following which the data is read out. A suitable priority encoding system (not shown) may be used to multiplex the data input from arrays 1, 2, 3, 4 with the address associated therewith. Ram 175 has input and output ports for input and output of data thereto.

Figure 4:
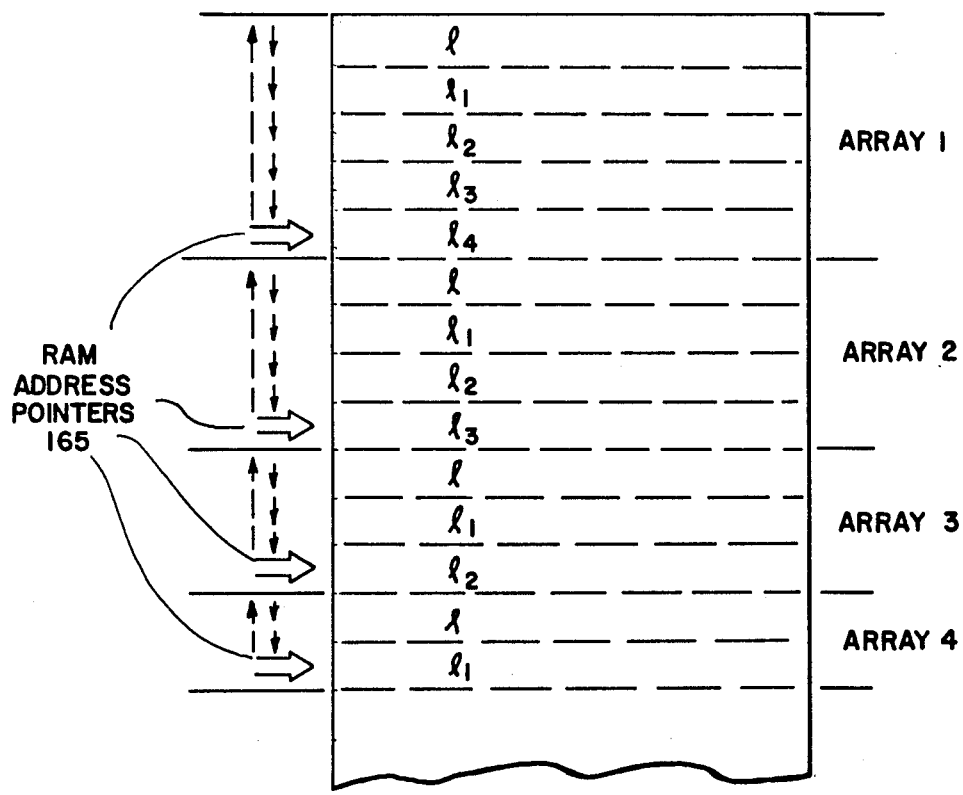
FIG. 4 is a schematic representation of the memory buffer for temporarily storing image data.

Since the degree of misalignment of arrays 1, 2, 3, 4 in the Y-direction may vary, the storage capacity of RAM 175 must be sufficient to accommodate the maximum misalignment anticipated. A worst case misalignment is illustrated in FIG. 4 wherein it is presumed that arrays 1, 2, 3, 4 are each misaligned by a full line. In that circumstance and presuming scanning of line 1 is completed, RAM 175 then stores the line data for lines 1, $1_1$, $1_2$, $1_3$, $1_4$ from array 1, lines 1, $1_1$, $1_2$, $1_3$ from array 2, lines 1, $1_1$, $1_2$ from array 3, and lines 1, $1_1$ from array 4. The blocks of binary data that comprise the completed line 1 are in condition to be read out of RAM 175. In the above example, an extra line of data storage is provided.

Line scan counters 170 are recycling counters which are individually preset for the number of lines of data to be stored for the array associated therewith. As a result, address pointers 165 operate in round robin fashion on a line by line basis. On reaching a preset count, the signal from counters 170 recycle the address pointer 165 assoicated therewith back to the first storage line to repeat the process. It is understood that prior thereto, that portion of RAM 175 has been cleared of data.

Figure 5:
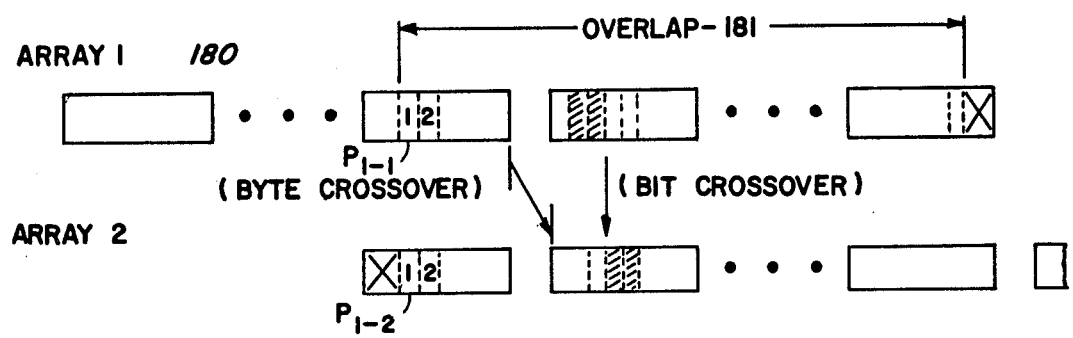
FIG. 5 is a schematic illustration of the data mapping arrangement to avoid bit shifting on readout from the temporary memory buffer of FIG. 4.

As described, data from video processing hardware 148 is stored temporarily in RAM 175 pending completion of the line. In placing the data in RAM 175, the data is preferably mapped in such a way as to avoid the need for subsequent data bit shifting when outputting the data. Referring to FIG. 5 wherein mapping of pixel data from arrays 1, 2 is illustrated, data from an earlier array (i.e. array 1) is mapped by Pixel Data Bit Mapper 149 (FIG. 3) into segments or words 180 before being stored in RAM 175. The first pixel ($P_1-1$) of the array within the array overlap 181 is mapped into a known bit position within the segment or word 180 at the point of overlap.

At the end of line transfer, the first pixel ($P_1-2$) of the succeeding array (i.e. array 2) is clocked into the bit position ($P_1-1$) of the first overlapped pixel of the previous array. This correlates the first overlapping pixel ($P_1-2$) of the succeeding array (i.e. array 2) with the first overlapped pixel ($P_1-1$) of the preceding array (i.e. array 1). Crossover from one array to the succeeding array on data readout may then be effected without the need to shift bits.

Figure 6:
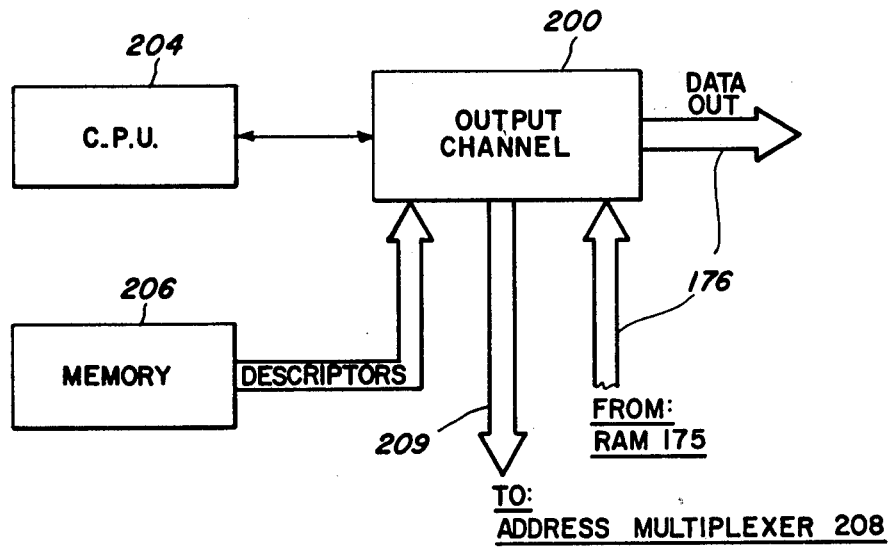
FIG. 6 is a schematic view showing the data readout system.
Figure 7:
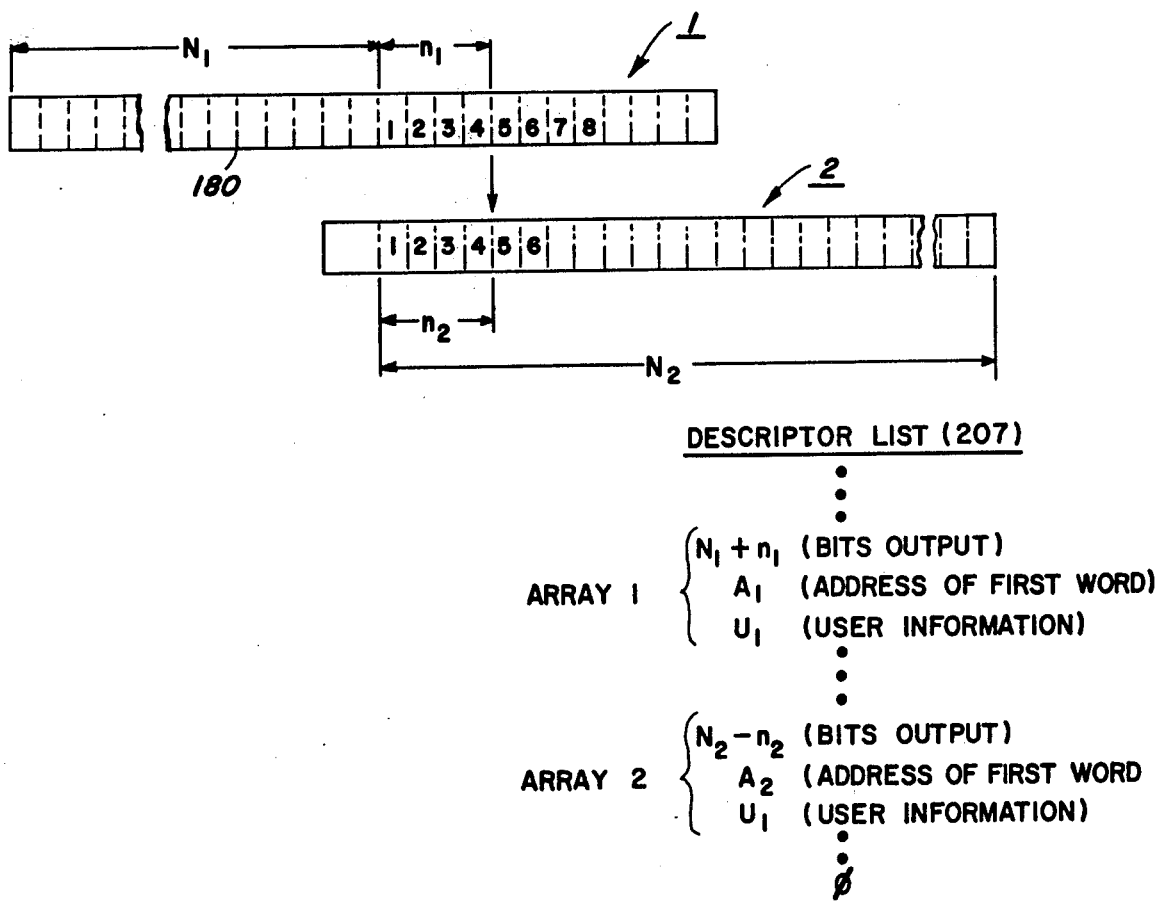
FIG. 7 is a schematic illustration of the data readout with crossover and removal of redundant data.

Referring now to FIGS. 6 and 7, video data held in RAM 175 is read out to a user (not shown) via RAM output bus 176, in both tangentially and spatially corrected form, line by line, through output channel 200. Data readout is controlled by a microprocessor, herein CPU 204 in accordance with address program instructions in memory 206. CPU 204 may comprise any suitable commercially available processor such as Model M6800 manufactured by Motorola, Inc.

The address program instructions in memory 206 include a descriptor list 207. List 207 contains information identifying the number of bits to be read out ($N_n$), the address of the first word (A), and other user information (U). The DATA OUT address information is fed to address multiplexer 208 via address bus 209.

As described heretofore, exact tangential alignment and end to end abutment of multiple arrays is difficult to achieve. In the arrangement shown, sagittal misalignment (in the Y direction) among the arrays is accommodated by offset counters 120 of the individual array operating circuits 114. The need to accurately abut the arrays end to end is obviated by overlapping succeeding arrays.

As a result of the above, the sequence in which video data is inputted to RAM 175 offsets sagittal misalignments between the several arrays. By outputting the data from RAM 175 on a line by line basis, the lines are reconstructed without sagittal misalignment.

Due to the overlapping disposition of arrays 1, 2, 3, 4, data within the overlapping portions of the arrays is redundant. To obviate this and provide a complete line of data without repeated or redundant portions, bit crossover on readout within the overlapping regions is used.

Referring now to the embodiment shown in FIG. 7, data bit crossover within the overlapping portions of arrays 1, 2, 3, 4 is effected by an algorithm which picks a predetermined last cell to be sampled within the overlapped region and automatically picks the next bit in the succeeding array. In the descriptor list 207 illustrated in FIG. 7, the totatl bit output from the first array is $N_1$ bytes $+n_1$ bits with the bit output from the second array $N_2$ bytes $-n_2$ bits. In the example shown in FIG. 7, crossover from array 2 to array 1 is effected between bit 4 and bit 5.

Figure 8:
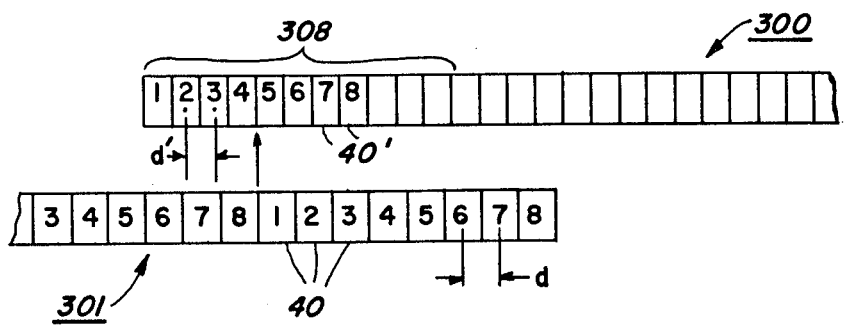
FIG. 8 is a schematic view illustrating a modified array wherein the center-to-center distances between the photosensitive elements of a portion of one array are changed to provide a vernier useful for aligning arrays.

In the arrangement described heretofore, the center-to-center distance between successive photosensitive elements or pixels 40 is constant. Referring to FIG. 8, wherein like numerals refer to the like parts a pair of arrays 300, 301 are there shown with the end portions overlapped. The photosensitive elements or pixels 40 that comprise arrays 300, 301, except for the end 308 of array 300, are on normal center-to-center distances d. The photosensitive elements 40' in the end 308 of array 300 are set on a slightly reduced center-to-center distance d'. The reduction in center-to-center distances between the photosensitive elements 40' in end 308 of array 300 provide in effect a vernier scale which normally provides at least one point where opposing arrays are in alignment irrespective of the degree of overlap between the arrays. In the exemplary arrangement shown, the end of photosensitive element 40-8 of array 301 is in substantial alignment with the start of photosensitive element 40'-5 of array 300, and crossover would be set at this point.

It will be understood that visual identification of the individual photosensitive elements or pixels 40, 40' to determine the optimum crossover point may be made through microscopic examination of the arrays. It is further understood that once the optimum crossover point is determined, the descriptor list of memory 206 (FIGS. 6, 7) is programmed to provide crossover from pixels 40-8 of array 301 to pixel 40'-5 of array 300 on readout.

While the vernier scale is illustrated as being at one end 308 of array 300 only, it is understood that vernier scales may be provided at both ends of the array. In that event, in a scanning arrangement employing four arrays such as shown in FIG. 2, array 1 may have a vernier scale of the type described at each end, array 3 a vernier scale at one end only, with remaining arrays 2, 4 conventional.

While the vernier scale described is established by reducing center-to-center distances between adjoining pixels, it is understood that a vernier scale may be created by increasing slightly the center-to-center distances between adjoining array pixels.

Figure 9:
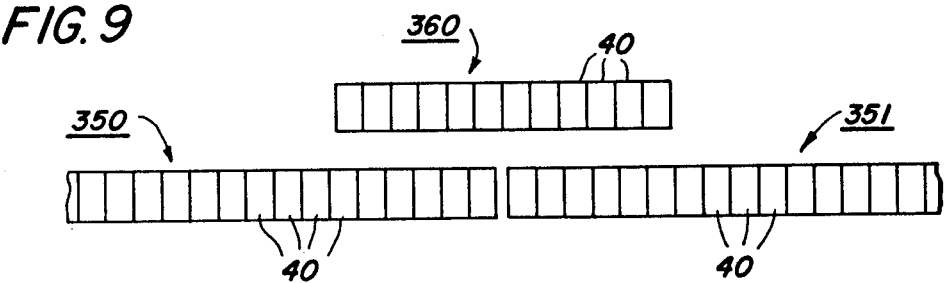
FIG. 9 is a schematic view of an alternate array configuration wherein a bridging array is employed to effect continuity between adjoining arrays.

Referring to the embodiment shown in FIG. 9, there a pair of relatively long linear arrays 350, 351 are disposed end to end. This may be effected optically as by means of lenses 43 in the scanning apparatus 10 of FIG. 1 or mechanically through physical contact of the array ends with one another. To accommodate any gaps between the array ends or misalignments along the X axis and to assure continuity of the composite array so formed, a relatively short bridging array 360 is provided to overlap the adjoining ends of each array 350, 351.

Bridging array 360 comprises a relatively short linear array, preferably with the minimum quantity of pixels 40 needed to provide effective overlap of the adjoining arrays. Typically, bridging array 360 may be comprised of the order of 100 pixels whereas arrays 350, 351 comprise some 1700 pixels.

In use, data from arrays 350, 351, 360 may be readout as described earlier, the data being stored temporarily in RAM 175 (FIG. 3) pending completion of the line. By choosing relatively short bridging arrays 360, the amount of data to be stored in RAM 175 and hence the size of RAM 175 may be substantially reduced. The data held in RAM 175 is, on completion of the line, read out from RAM 175 into bus 176 (FIG. 6), with crossover made from array 350 to bridging array 360 and thereafter from bridging array 360 to array 351 in the overlapping areas to assure continuity.

Figure 10:
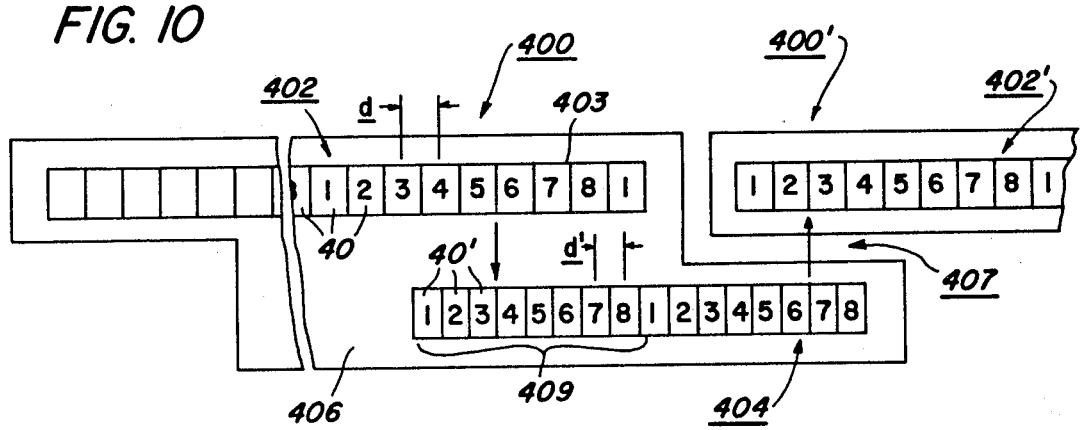
FIG. 10 is a schematic view of another alternative array configuration wherein a bridging array is combined with a standard array to form a unitary structure, the photosensitive elements of the bridging array being on different center-to-center distances to provide a vernier.

Referring to the embodiment shown in FIG. 10, where like numerals refer to like parts, an array structure 400 is thereshown. Array structure 400 includes relatively long and short arrays 402, 404 respectively mounted upon a common substrate or mask 406. Array 404 is disposed in parallel with array 402, with a portion 409 of array 404 overlapping one end 403 of array 402. The remainder of array 404 projects beyond end 403 of array 402 and is adapted to overlay the leading end of the next successive array structure 400' as seen in drawing FIG. 10. To accommodate overlapping of successive array structures 400, substrate 406 is inset at 407.

To enhance alignment between the arrays and provide undistorted crossover between arrays, photosensitive elements or pixels 40' of array 404 are disposed on a center-to-center distance d' different from the center-to-center distance d of pixels 40 of array 402. This in effect establishes a vernier scale which enables at least one pixel 40' of array 404 to be aligned with a corresponding pixel 40 of array 402. In the exemplary arrangement shown, pixel 40-5 of array 402 is in substantial alignment with pixel 40'-4 of array 404 and crossover would be effected at this point.

Similarly, when associating the array structure 400 with the next succeeding array structure 400', crossover from array 404 to array 402' is selected at the point of closest pixel alignment. In the embodiment shown, crossover would be between pixel 40'-7 of array 404 and pixel 40-3 of array 402.

While the center-to-center distance d' between pixels 40' of array 404 is illustrated as being less than the center-to-center distance d between the pixels 40 of array 402, it is understood that dimension d' may be greater than dimension d.

While the invention herein has been described in exemplary fashion in a raster type input or scanning apparatus environment, it will be understood that the principles of the present invention may be utilized with raster type output, i.e. imaging devices. In that type of application, multiple imaging elements, herein, imaging arrays 500, are arranged in succession upon a support structure or base as in the case of the photosensitive linear arrays 1, 2, 3, 4 described heretofore. The imaging arrays 500 are disposed with the adjoining ends thereof overlapping to enable the entire length of the line to be covered by arrays whose individual linear extent is less than the line length.

Referring to FIG. 11, an exemplary arrangement is shown employing plural imaging arrays 500, 500' disposed so that the adjoining ends 501, 501' overlap. Imaging arrays 500, 500' are each comprised of a plurality of light emitting diodes (L.E.Ds herein) 505 mounted in succession upon a suitable base 506. Arrays 500, 500' are arranged in operative exposure relationship with the relatively movable photoconductive member 508 of a xerographic apparatus (not shown).

As understood by those skilled in the xerographic arts, exposure of the photoconductive member 508, which has been previously uniformly charged by a suitable corona type charging device, discharges the charged portions of member 508 in a pattern corresponding to the illumination pattern of L.E.D.s 505. The latent electrostatic image created thereby on photoconductive member 508 is thereafter developed with a suitable electroscopic marking material, i.e. toner. The developed image may be then transferred to a suitable copy substrate material, i.e. paper, and fused to provide a permanent copy of the image.

Imaging arrays 500, 500' may be loaded with binary image data from a suitable source such as random access memory (RAM) 515 through serial-to-parallel buffers 516, 516'. The output gates of buffers 516, 516' are coupled to the individual L.E.D.s 505 comprising exposure arrays 500, 500' through control gates 518, 518'. A suitable trigger source (not shown) enables gates 518, 518' following loading of the last bit of image data in the buffer 516, 516' associated therewith.

In operation, the output gates of buffers 516, 516' are loaded with a binary signal pattern representative of the image data stream inputed thereto. On enabling of gates 518, 518', individual L.E.D.s are actuated in accordance with the binary signal pattern to discharge photoconductive member 508 in correspondence with the image data.

To prevent repetitive exposure of photoconductive member 508 in areas where exposure arrays 500, 500' overlap, crossover is made electronically from array 500 to array 500' within the overlapping areas 501, 501'. Crossover may be effected by a controlling algorithm which picks a predetermined image bit within the overlapping area as the last image bit for imaging array 500 and the next image bit of the data stream as the first image bit for imaging array 500'. Buffers 516, 516' are loaded with data bits corresponding to the L.E.D.s 505 to be used in each array 500, 500'.

For example, if it be assumed that each image line comprises 2000 image bits and that each imaging array 500, 500' has 1100 L.E.D.s, the array overlap totals 200 L.E.D.s and falls in the range of 1000 and 1200 image bits. If the crossover point is selected between image bits 1099 and 1100, buffer 516 would be loaded with image bits 0–1099 and buffer 516' loaded with image bits 1100–2000. The L.E.D.s of array 500 corresponding to image bits 1100–1200 would not be used. Similarly, the L.E.D.s of array 500' corresponding to image bits 1000–1099 would be unused in this crossover example.

To facilitate alignment of exposure arrays 500, 500' with one another in the overlapping ends 501, 501' thereof, exposure array 500 may be constructed having L.E.D.s 505 in the end 501 thereof on different, i.e. reduced, center-to-center distances in the manner illustrated in FIG. 8 in connection with scanning array 300. A small bridging exposure array, either separate from the principal exposure array as in FIG. 9 or integral therewith as in FIG. 10, may also be contemplated. The L.E.D.s comprising the bridging array may have center-to-center distances different from that of the principle exposure arrays to facilitate aligning of the L.E.D.s for crossover purposes through a venier technique.

While an overlapping exposure array pair 500, 500' has been illustrated and described herein, it will be understood that the principles of the invention are applicable to exposure array configurations employing more than two arrays.

Further, imaging array constructions employing multiple imaging devices other than L.E.D.s 505 and which may produce images on imaging material other than photoconductive member 508, for example, copy paper, may be contemplated as, for example, exposure arrays comprised of multiple injection lasers or laser diodes, or printing arrays comprised of multiple ink jets, or electrostatic writing arrays comprised of multiple electrostatographic styli, or thermo magnetic (i.e. Curie point) arrays comprised of multiple thermal heads, or ferro magnetic imaging arrays comprised of multiple magnetic recording heads.

While the invention has been described with reference to the structure disclosed, it is not confined to the details set forth, but is intended to cover such modifications or changes as may come within the scope of the following claims:

What is claimed is:

1. An imaging array for use in a multiple imaging array structure comprising:
   a. an array support,
   b. means forming a first relatively long linear imaging array on said support;
   c. means forming a second relatively short imaging array on said support, said second linear array being offset from and substantially parallel with said first imaging array, said second imaging array having a portion thereof overlapping one end of said first imaging array with the remainder of said second imaging array projecting beyond said first imaging array one end whereby to permit said first imaging array to be disposed in end-to-end relation with a third imaging array with the projecting portion of said second array overlapping the adjoining end of said third array to provide an uninterrupted imaging path.

2. The array according to claim 1 in which said first and second imaging arrays include a succession of discrete imaging elements on said support, the center-to-center distance between adjoining imaging elements of said second array being different from the center-to-center distance between adjoining imaging elements of said first array whereby to facilitate alignment of at least one imaging element in said second array with an imaging element in said first array.

3. The array according to claim 2 in which the center-to-center distance between adjoining elements of said second array is less than the center-to-center distance between adjoining imaging elements of said first array.

4. The array according to claim 2 in which the center-to-center distance between adjoining imaging elements of said second array is greater than the center-to-center distance between adjoining imaging elements of said first array.

* * * * *